United States Patent [19]

Graney

[11] Patent Number: 4,841,639
[45] Date of Patent: Jun. 27, 1989

[54] HAND OPERATED PORTABLE BAND SAW FOR CUTTING BOARDS FROM A LOG

[76] Inventor: Frank X. Graney, 50 Vale St., Tewksbury, Mass. 01876

[21] Appl. No.: 6,891

[22] Filed: Jan. 27, 1987

[51] Int. Cl.$^4$ .............................................. B27B 15/02
[52] U.S. Cl. ....................................... 30/380; 30/372; 83/745; 83/817; 83/820
[58] Field of Search .................. 30/371, 373, 376, 377, 30/380, 372; 83/574, 745, 795, 796, 813, 816, 817, 820

[56] References Cited

U.S. PATENT DOCUMENTS

| | | | |
|---|---|---|---|
| 2,274,923 | 3/1942 | Hedgpeth | 83/817 |
| 2,604,910 | 7/1952 | Crosby | 30/380 |
| 3,658,102 | 4/1972 | Joosten | 30/373 |
| 3,961,550 | 6/1976 | Oliver et al. | 83/817 X |
| 4,189,968 | 2/1980 | Miranti | 83/820 X |
| 4,332,084 | 6/1982 | Lovas et al. | 30/380 |

*Primary Examiner*—Frank T. Yost
*Assistant Examiner*—Michael D. Folkerts
*Attorney, Agent, or Firm*—Robert T. Dunn

[57] ABSTRACT

A portable band saw for cutting boards of variable thickness from a log has a frame that carries the band saws wheels and a space between the cutting length of the band and the frame that is large enough for the board that is cut from the log to fit through and a slide or rollers for riding on the log when the band saw is cutting a board from the log is carried by the frame in the space between the cutting length of the band and the frame so that the band saw rides along the log from end to end of the log while cutting a board from the log of thickness determined by the space between the cutting length of the band and the bottom of the slide. In a preferred embodiment of the invention, to make the first cut on a rough log, anchor plates are attached to each end of the log that carry supports for a smooth rigid beam suspended between the supports on which the band saw slide rides to cut a straight flat surface longitudinally along the log.

18 Claims, 5 Drawing Sheets

HAND OPERATED PORTABLE BAND SAW FOR CUTTING BOARDS FROM A LOG

BACKGROUND OF THE INVENTION

The present invention relates generally to band saws and more particularly to portable band saws for cutting boards from a log in situs.

Portable band saws have been provided mounted on a carriage that rides along a track to cut a board from a log that is supported above the track. Such equipment provides a platform for the track that is at least as long as the log to be cut, a carriage on extended legs that rides above and clears the log to be cut which is carried on a platform above the track and the bandsaw and its power drive are carried on the carriage. An example of such apparatus is described in U.S. Pat. No. 4,275,632 entitled "Portable Sawmill", which issued June 30, 1981 W. K. Ross. Similar apparatus is described in U.S. Pat. No. 4,519,283 entitled "Band Saw Mill", which issued May 28, 1985 to D. Sandborne and another similar apparatus is described U.S. Pat. No. 4,559,858 entitled "Portable Band Saw Saw Mill Apparatus", which issued Dec. 24, 1985 to Laskowski et al. These apparatus all include band saws, a carriage for the band saw, a track supported from the ground either directly on the ground or on a trailer and a support for the log that is also on the trailer and the carriage has extended legs so that the band saw carries rides above the log to be cut.

While these apparatus can be used to cut logs in situs, none of them can be used to cut a log lying on the ground, and while they are referred to as being portable, they are not hand portable and in fact are carried on a trailer and all require that the user somehow lift the log onto the apparatus for cutting. It is an object of the present invention to provide a hand portable band saw apparatus for cutting boards of variable thickness from a log lying on the ground.

A portable band saw according to the present invention uses the flat surface of a longitudinal cut from end to end of the log to ride on while making a subsequent cut. In order to make the first cut of a raw log and provide that flat surface, a surface must be provided for the portable band saw to ride on. It is another object of the present invention to provide apparatus that is readily installed on a raw log to provide a flat longitudinal surface for a band saw according to the present invention to ride on in making a first longitudinal cut of the log.

For any band saw, a guide at each of the band saw wheels is provided that bears against the straight edge (non-cutting edge) of the band and keeps the band from sliding off the wheel on the side thereof of the straight edge. Such a guide is usually a small roller on a bearing and axle carried on the band saw frame. However, no such guide is provided against the tooth edge (cutting edge) of the band, because the cutting edge would be damaged by a guide bearing against it and so would the guide. As a result, usually there is no guide to prevent the band from sliding off a wheel in the direction of the cutting edge of the band and so when the band does slide off the wheel in that direction the band is usually ruined and some of the band saw frame may also be damaged. It is another object of features of the present invention to provide means for preventing the band from sliding off a wheel in the direction of the cutting edge that does not damage the band teeth and/or holds the slipping band on the wheel long enough to enable the operator to stop the band saw drive.

Maintaining or adjusting a band saw band tension is usually done by shifting the position of the axle of the idler wheel. It is another object of features of the present invention to provide a mechanism shifting the position of the axle of the idler wheel under a resilient force that is adjustable so that the position of the axle is not fixed, but rather is subject to the resilient force acting against the band tension. It is a further object to provide such resilient force with a mechanical advantage against the band tension.

Moving the idler wheel relative to the driven wheel adjusts band tension. When the wheels and band are perfectly constructed and aligned in a common plane and the wheel axes parallel and there is no force on the band tending to move it off the wheel rims the band will stay centered on the wheel rims. However, such optimum conditions are seldom achieved and so not only must guards be provided to keep the band centered on the wheel rims, but also means may be provided for adjusting the alignment of the wheels. For example, means may be provided for tilting the plane of one of the wheels with respect to the other to make such adjustments. It is another object to provide means for tilting the plane of the idler wheel with respect to the plane of the driven wheel.

SUMMARY OF THE INVENTION

The shape of the band saw frame is generally an inverted U shape. Each side of the frame inverted U shape carries one of the band saw wheels and the cutting length of the saw band extends at the bottom of the inverted U shape from one side to the other. The space between the cutting length of the band and the frame above it is large enough for the board that is cut from the log to fit through. More particularly, a slide or rollers for riding on the log top flat longitudinal surface when the band saw is cutting a board from the log is carried by the frame in the space between the cutting length of the band and the top of the frame so that the band saw rides along the log from end to end of the log while cutting a board from the log of thickness determined by the space between the cutting length of the band and the bottom of the slide.

The frame is a rigid structure that is essentially symmetrical with respect to the plane defined by the two wheels of the band saw. In a particular embodiment, the frame structure includes a rigid horizontal beam and rigid downward extending side members from that beam that carry the driven and the idler wheels of the band saw and the slide or rollers that ride on the log top flat surface. The idler wheel is carried by a downward extended member that pivotally attaches to the beam and for which the pivot is adjustable to adjust tension in the band.

In a preferred embodiment of the invention, additional apparatus is provided to make the first cut on a raw log and so provide the flat longitudinal surface of the log for the bandsaw apparatus to ride on. The additional apparatus includes anchor plates that are attached to each end of the log with spikes. The anchor plates carry supports for a smooth rigid beam suspended between the supports on which the band saw slide rides to cut a straight flat surface longitudinally along the log.

Another feature of a preferred embodiment of the present is a roller of tough, relatively soft material located to inhibit the band from sliding off a wheel in the direction of the cutting edge the material being much softer than the band material (which is usually steel). For example, the roller may be made of plastic material life Teflon that does not damage the band teeth, but will hold the slipping band on the wheel long enough to enable the operator to stop the band saw drive before the band teeth cut through the Teflon to the a harder material beneath.

Another preferred featurer is to provide means for maintaining and adjusting the band tension. This includes a lever carrying the idler wheel at one end and a spring loaded adjusting mechanism at the other end and the lever pivot in between. The mechanism is anchored to the band saw frame and has a screw adjustable portion that acts on a coil spring that bears against the end of the lever and so the spring force against the lever arm is adjustable and is resisted by the band tension applied by the idler wheel at the other end of the lever. In addition, this mechanism can vary the tilt of the plane of the idler wheel with respect to the plane of the driven wheel. That adjustment is useful to compensate for various imperfections of the band and/or the drive and idler wheels.

It is a further object of the present invention to provide a portable hand operated band saw for cutting boards of variable thickness from a log in which all of the weight of the portable band saw rides on the log on the top surface of the board that is being cut from the log.

It is another object to provide a portable bandsaw that is readily operated by one man to cut boards from a log while the log is lying on the ground.

It is another object to provide a bandsaw for cutting boards from a log that does not require loading the log onto a platform in order to cut boards from it.

These and other features and objects of the present invention will be apparent in view of the following description of specific embodiments of the invention taken in conjunction with the drawings.

DESCRIPTION OF THE EMBODIMENTS OF THE INVENTION

Turning first to FIGS. 1 to 4 there is shown the continuous band 1 that is carried on wheels 2 and 3 on spaced parallel axis. Wheel 2 is the driven wheel and wheel 3 is the idler wheel and is also the tension wheel of the band saw. Power to the driven wheel is delivered from drive 4, that may be an electric motor or an internal combustion engine, to drive pulley wheel 5 driving wheel 2 by drive belt 6. The frame 10 that carries the wheels is a rigid essentially symmetrical structure. It is symmetrical with respect to the plane defined by the wheels 2 and 3 and it consists of a transverse (horizontal) beam 11 vertical extending front and back plates 12 and 13 on the driven side of the beam, vertically extending front and back plates 14 and 15 on the idler side of the beam and a second transverse bar 16 parallel to bar 11 that connects to all of the plates 12 to 15 at the top of the structure. Thus, the frame as viewed from the front as in FIG. 1 defines an inverted U shape and provides a space 20 between the downward extending sides of the inverted U shape and the cutting part of the band 1a crosses space 20 and forms the lower edge of the space while the return portion 1b of the band defines the upper edge of space 20. The band moves in the direction of arrow 1c.

Figure 2:
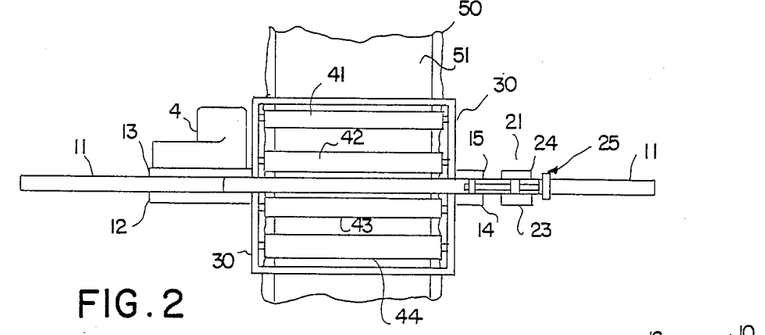
FIG. 2 is a top view of the portable band saw operating as in FIG. 1.
Figure 3:
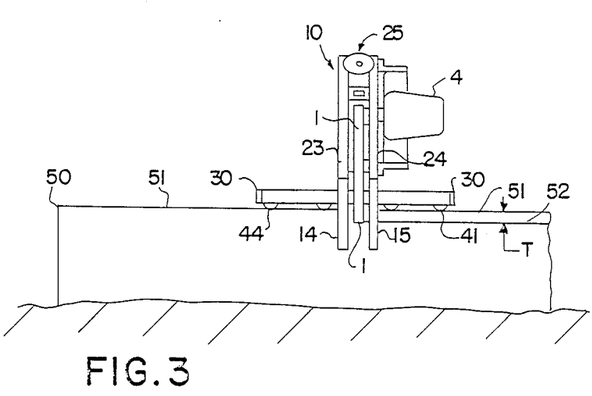
FIG. 3 is a side view of the portable band saw operating as in FIG. 1.

The top and side views in FIGS. 2 and 3 show the front plates 12 and 14 and the back plates 13 and 15 and cross bars 11 and 16 that form the rigid frame structure. These parts may be bolted or welded together and are designed and connected for strength and light weight.

Figure 1:
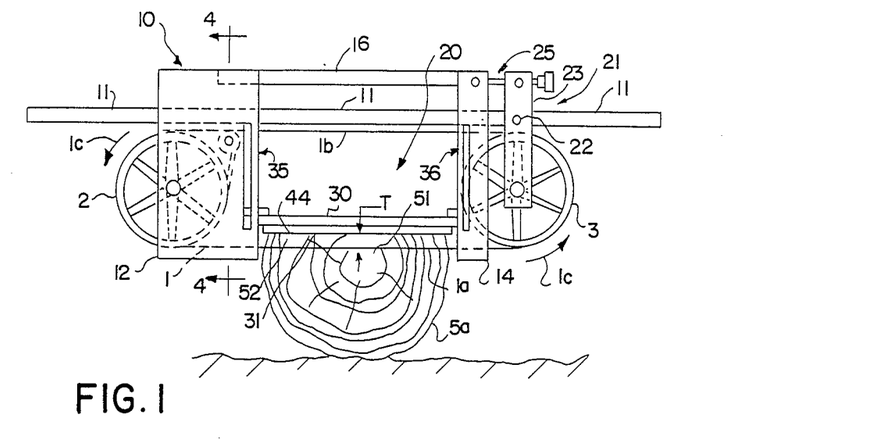
FIG. 1 is a front view of the portable band saw riding on a cut surface of a log while cutting a board of predetermined thickness from the log.

Idler wheel 3 of the band saw is suspended at the lower end of the pivoting lever arm 21 that pivots on axle 22 through transverse bar 11. Arm 21 is comprised of front and back plates 23 and 24 against the front and back, respectively of the transverse bar 11. Between these plates at the lower end is mounted idler wheel 3 and so the plates connect together at the axle of idler wheel 3 and at the pivot axle 22. They also connect at the top end where they connect to band tension adjustment mechanism 25. That mechanism is shown enlarged in detail in FIGS. 11 and 12. The tension adjusting mechanism 25 pivots lever 21 about its pivot axis 22 to adjust the tension in the band and also tilts or skews the lever to tilt or skew idler wheel 3 with respect to driven wheel 2 as necessary to compensate for imperfections in the band, wheel alignment, etc..

In the space 20 on tracks along the inside edges of the downward extending sides of the frame is a platform 30 adapted to ride on a flat cut surface like 51 extending along the top of the log 50. The bottom plane 31 of the platform contacts the flat surface 51 of the log and the dimension between 31 and 51 is the thickness of the board, like board 52 that is cut from the top surface of the log. That spacing is defined herein as the dimension T. Platform 30 is carried on tracks 33 and 34 on the inside of the downward extending sides of the frame. The tracks 33 and 34 are each substantially the same and each includes an elongated slot in the front and back plates of the side like slot 35 in plate 12 and slot 36 in plate 14. Followers attached to platform 30 ride in these slots and a lock mechanism (now shown) is provided to lock the position of the followers in the slot and so fix the position of the platform 30 in space 20 to provide the desired thickness T of board cut from the log.

Platform 30 is adapted to ride easily along a flat surface like a longitudinal cut surface of a log. For that purpose, the bottom plane 31 of the platform is adapted to roll or slide on the surface. If it slides, longitudinal runners are provided coated with a material that slides easily on rough or textured surfaces. For example, the runners may be coated with Teflon, or rollers may be provided in the platform to define the plane 31. In that case the rollers are carried by the platform on axles transverse to the length of the log and it is preferred that at least four such rollers be provided. The four rollers 41 to 44 are arranged two in front and two in back of the plane defined by the band saw wheels. The two inner rollers 42 and 43 are spaced close to that plane and so one is immediately in front of the plane and the other is immediately in back of the plane. The other two rollers are at the extreme ends of the platform, roller 41 being at the extreme back end of the platform and roller 44 being at the extreme front end of the platform. With this arrangement of rollers the apparatus rests stably on a log and can be moved easily the length of the log in operation to cut a board like board 52 from the top surface of the log.

The bandsaw apparatus can be operated by one operator at the drive side of the apparatus who may position himself alongside the motor on that side and grasp the extending end of transverse structural bar 11 to push (slide or roll) the apparatus along the top surface of the logs to cut a board like board 52 from the top surface of the log. Clearly, operating is even easier when done with two operators one positioned as described and the other on the other side of the log holding the other end of transverse bar 11. The two operators merely walk the apparatus down the length of the log to cut the board and then repeat the process beginning from either end of the log to cut another board after setting the dimension T by moving the platform in its tracks.

Figure 6:
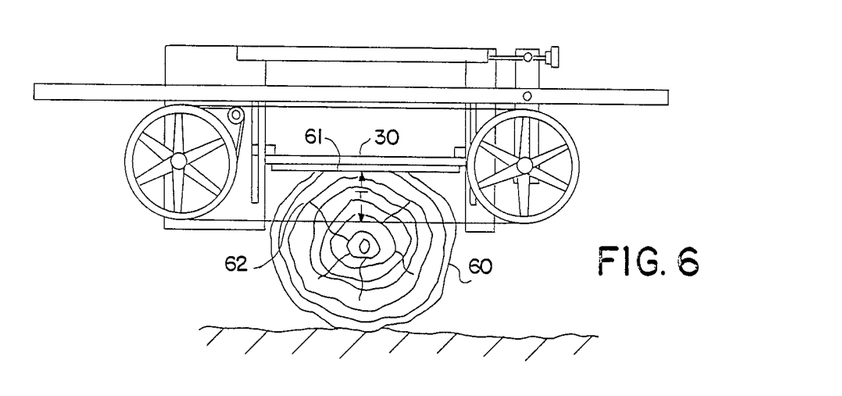
FIG. 6 is a front view as in FIG. 1 with the front plates of the frame and lever removed showing the apparatus operating to cut a very thick board from the log.

FIG. 1 as described shows the apparatus cutting board 52 as it rides along tee top flat surface 51 of log 50. The board 52 is clearly an inch or two thick and can be trimmed lengthwise or cut lengthwise to form several planks. To cut a wood beam from the log, the platform 30 is moved evenly along tracks 35 and 36 to increase dimension T to the beam thickness desired. This operation is shown in FIG. 6 where the apparatus platform 30 rides on top surface 61 of log 60 and cuts a piece 62 of thickness T from the top of the log. Once cut, piece 62 is trimmed and may be cut longitudinally into several beams of crosswise dimension T.

Driven Wheel and Pulley Drive

Figure 4:
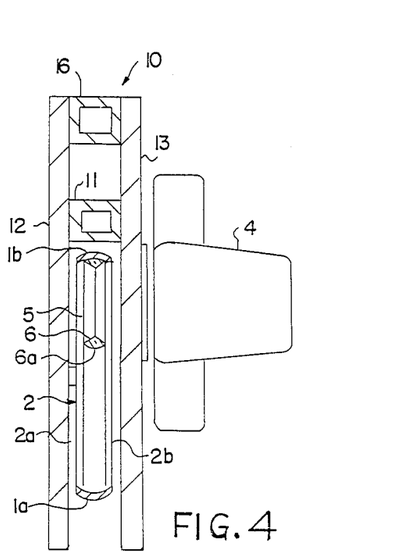
FIG. 4 as an enlarged side partially cross section view taken as shown in FIG. 1.

As shown in FIG. 4, the pulley drive wheel 5 has a V groove to accommodate drive belt 6. The driven wheel 2 also has a V groove around the rim thereof for the belt and so pulley wheel 5, belt 6 and driven wheel 2 are all in the same plane and the pulley drive wheel is between the cutting portion 1a and return portion 1b of the band. Thus, the portion of the driven wheel rim that the band rides on is formed in part (the central part) by the outer surface 6a of drive belt 6 and that surface is slightly convex as viewed in FIG. 4 and meets the front and back rim edges 2a and 2b of wheel 2 that have the same convex shape. This convex shape tends to keep the band on the wheel.

Figure 7:
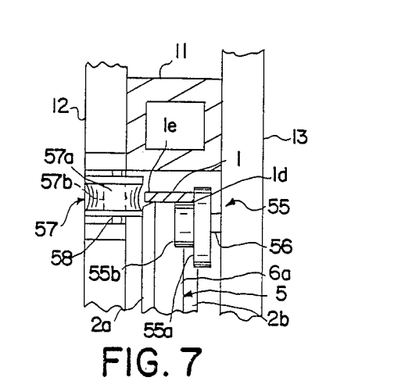
FIG. 7 is an very much enlarged partial side cross section view taken as shown in FIG. 5 showing the straight edge and the tooth edge guides for the band where the band enters the drive wheel.
Figure 8:
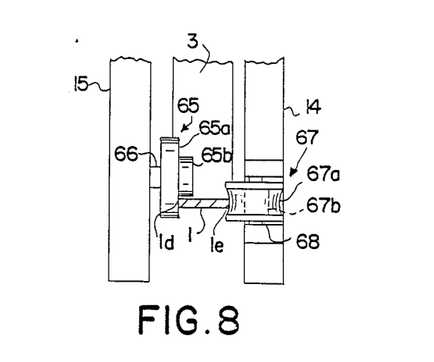
FIG. 8 is an very much enlarged partial side cross section view taken as shown in FIG. 5 showing the straight edge and the tooth edge guides for the band where the band enter the idler wheel.

Usually raised edges are not provided on the wheel even on the straight edge side of the band, because it would wear the edge too much. In accordance with a feature of the present invention, roller guides are provided against the straight and against the cutting edges of the band where the band enters each wheel. These are shown in FIGS. 7 and 8.

Band Guide Rollers

The guide wheels are essentially the same for the straight edge of the band at both places and they are essentially the same for the cutting edge of the band at both places. FIG. 7 is an enlarged cross section view taken as shown in FIG. 5 showing front and back plates 12 and 13, transverse beam 11, drive wheel 2 and band 1 (of the band return part 1b ) just before the band goes onto the drive wheel 2. At that position along the band is located straight edge guide roller 55 that rotates on its roller axle 56 that is parallel to the wheel axle and cutting edge guide roller 57 rotates on its roller axle 58 that is perpendicular to the wheel axle.

The straight edge roller axle 56 is mounted to rear plate 13 and the cutting edge roller axle 58 is mounted to front plate 12. Roller 55 has a shoulder 55a against which the band straight edge 1d rides and which prevents the band from sliding laterally off wheel 2 toward back plate 13. Clearly, roller 55 could be oriented with its axle parallel to the axle of roller 57 so that the band straight edge 1d rode against the boss 55b of the roller rather than the shoulder.

Cutting edge roller 57 has a peripheral part 57a that is made of material that is substantially softer than the teeth on the cutting edge 1e of the band. That material may be a softer metal like brass, copper or lead, or it may be a tough plastic like Teflon. The purpose of that soft material is to take up the shock of the cutting edge bearing against it and so prevent the band from sliding off the wheel in that direction and, in effect, kicks the band back onto the wheel, or at least holds the band on the wheel long enough for the operator to stop the motor drive. Such a roller may be contacted many times by the band before the softer peripheral material is so torn up that the roller must be replaced. In that case, it will have served its purpose without damaging the cutting edge 1c of the band.

In the event the softer peripheral material 57a of roller 57 becomes excessively worn or is cut through by the band teeth, then the danger arises that the band will come so far off the wheel on the cutting edge side that the band will cut into frame plate 12. To prevent that, even at the expense of damaging the cutting edge of the band, the inner core 57b of roller 57 may be made of hard material or at least hard enough that it cannot be cut through by the cutting edge on the band. Thus, a stop roller is provided on both sides of the band and on the cutting side a buffer is provided between the stop roller and the band teeth to make small corrections to band slippage without damaging the band cutting teeth.

At the entrance of the band to idler wheel 3, shown in FIG. 8, similar roller guides are provided for the same purposes. Here straight edge guide roller 65 rotates on its roller axle 66 that is parallel to the wheel axle and cutting edge guide roller 67 rotates on its roller axle 68 that is perpendicular to the wheel axle. Straight edge roller axle 66 is mounted to rear plate 15 and the cutting edge roller axle 68 is mounted to front plate 14. Roller 65 has a shoulder 65a against which the band straight edge 1d rides and which prevents the band from sliding laterally off wheel 3 toward back plate 15.

Also cutting edge roller 67 has a peripheral part 67a that is made of material that is substantially softer than the teeth on the cutting edge 1e of the band for the purpose of taking up the shock of the cutting edge bearing against it and so prevent the band from sliding off the wheel in that direction.

Attachment For First Cut Of Raw Log

Figure 5:
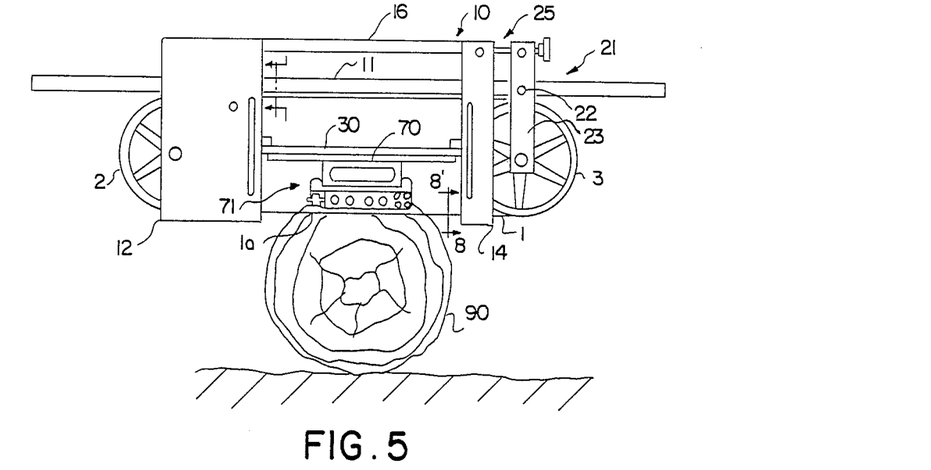
FIG. 5 is the same view of the apparatus as in FIG. 1, mounted on a level beam suspended along the top of the log at anchored supports at each end of the log on which the band saw apparatus rides to make the first longitudinal cut of a raw log to provide a flat surface along the top of the log from which to cut boards from the log.

Both of the operations shown in FIGS. 1 and 6 begin with a flat longitudinal surface like surface 51 in FIG. 1 and surface 61 in FIG. 6 along the top of the log. Such a surface is required for the platform 30 to ride on in order to make a clean flat longitudinal cut down the length of the log. Clearly such a surface is not normally provided on a raw log and so a first cut must be made along the top of a raw log to provide that surface. FIG. 5 shows additional apparatus for making that first cut of log 90. It includes a longitudinal beam 70 of fixed dimension that may be wood or metal attached to the top of the log. That beam 70 is mounted longitudinally on top of the log supported at each end of the log at anchored support members like support member 71 that is fixed to the end of the log by spikes driven into the log. The beam 70 and support member 71 are shown more fully in enlarged side and end views in FIGS. 9 and 10, respectively.

Figure 9:
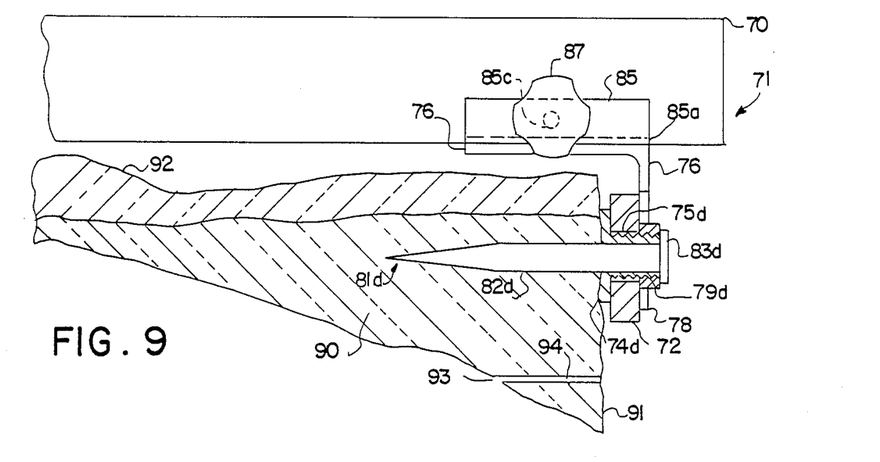
FIG. 9 is a side cross section view of and end of the log showing the anchor plate and beam support member attached thereto for supporting the beam shown in FIG. 5 and described herein with reference to FIG. 5.
Figure 10:
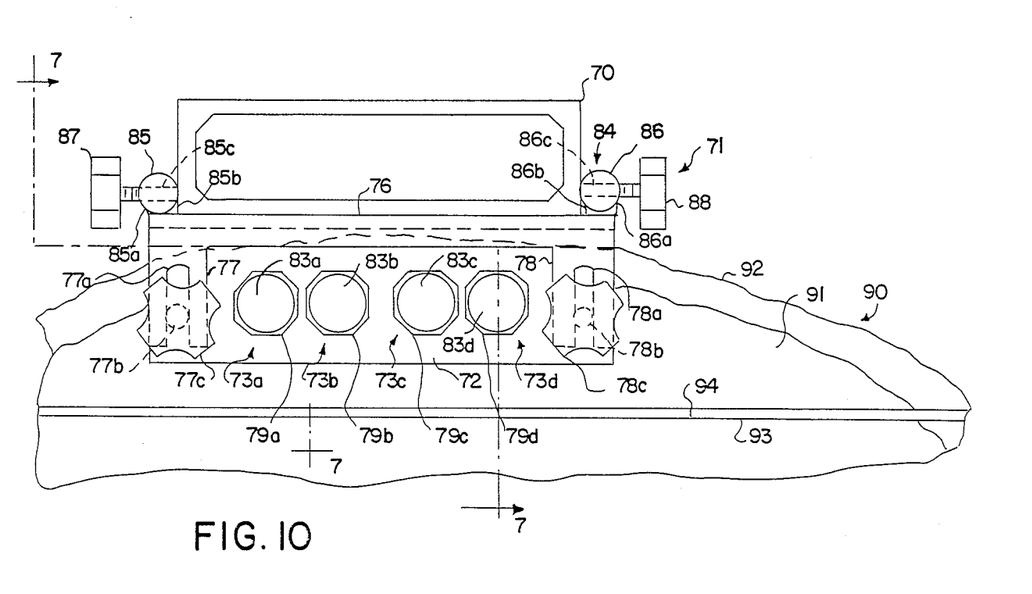
FIG. 10 is a front view of the same end of the log showing the anchor plate attached thereto and carrying the support member and beam.

FIGS. 9 and 10 show one of the anchored support members 71 at the same end of the log as shown in FIG. 5. Here, the rough top surface of the raw log is represented by the bark 92. Anchored support 71 includes several parts: anchor plate 72 fitted with four hollow threaded bushings like bushing 73d spaced along the plate and four spikes 81a to 81d. The bushings 73a to 73d have thin heads 74a to 74d on the inside of anchor plate 72 and the threaded parts project through clearance holes 75a to 75d in the anchor plate to the outside of the plate and are secured thereto by bushing nuts 79a to 79d, respectively. Beam support member 76 that is generally L shaped as viewed from the side is attached to the outside of the anchor plate.

Beam support member 76 attaches adjustably to anchor plate 72 by slotted tabs 77 and 78 that go against anchor plate 72 and the slots 77a and 78a thereof align with tapped holes 77b and 78b in plate 72. At these tab slots, support 76 is secured to plate 72 by hand screws 77c and 78c. As mentioned, bushings 73a to 73d are hollow and are bored axially at 80a to 80d for a snug fit with the spikes. Thus, the spike shafts 82a to 82d of spikes 81a to 81d fit snugly and slideably in the bushing bores.

With the beam support member 76 and anchor plate 72 so attached, the entire anchored support member 71 is positioned at the end 91 of log 90 and another identical anchor support is attached at the other end of the log. When these anchor supports are roughly aligned, spikes 81a to 81d are driven through the bushings into the ends of the log up to the spike heads 83a to 83d and in this way the anchor beam supports are firmly secured to ends of the log. Then, beam 70 is laid in the channels like channel 84 of the anchor beam supports and secured to the channels as described below.

Channel 84 on top of member 76 may be formed by short lengths 85 and 86 of rod, welded at 85a and 86a to the top of member 76. Rods 85 and 86 are spaced apart for a snug fit therebetween of beam 70 and the welds are cut back at 85b and 86b to insure that just the inner periphery of each rod contacts the side of the beam. Rods 85 and 86 are drilled transversally at 85c and 86c for hand set screws 87 and 88, respectively, that set into the sides of the beam to secure it to the channel 84 of the support. Then final adjustments of the position of support member 76 is made by loosening the hand screws 77c and 78c and moving support 76 slightly as necessary and then tightening these hand screws again when beam 70 is at exactly the desired position.

Then the band saw apparatus is mounted on the beam as shown in FIG. 5 and a cut like cut 93 is made just below the anchor support and so a level cut surface 94 is provided along the top of the log. Thereafter, the beam 70 and anchor supports need not be used for each subsequent cut of a board or beam from the log.

Band Tension Adjustment Mechanism

Figure 11:
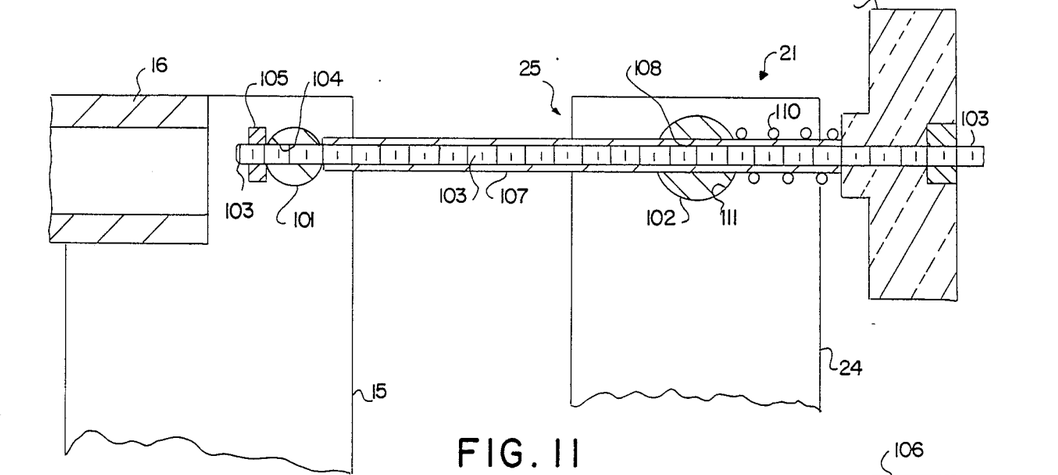
FIG. 11 is a very very much enlarged front cross section view of the band tension adjustment mechanism of the portable bandsaw of FIGS. 1 to 6.
Figure 12:
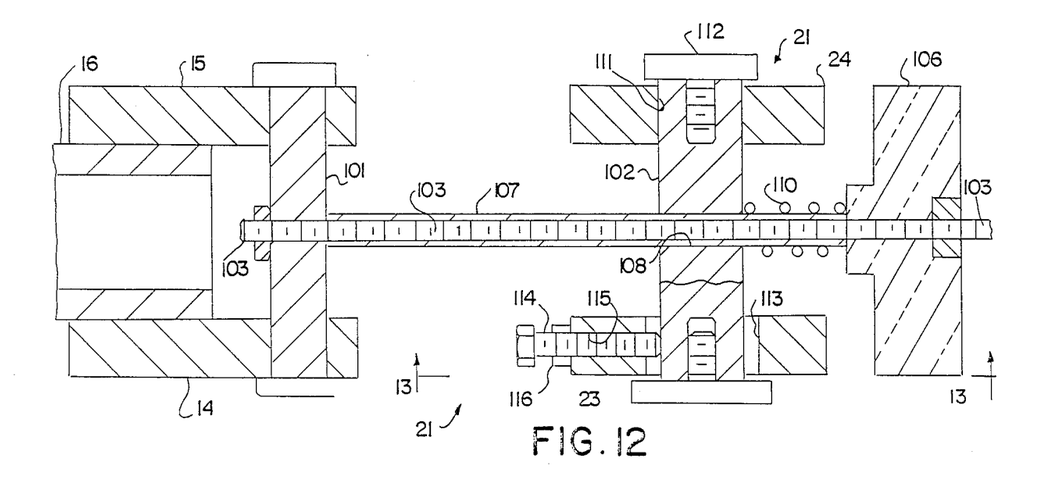
FIG. 12 is a top cross section view of the band tension adjustment mechanism of the portable bandsaw of FIGS. 1 to 6 taken as shown in FIG. 9.
Figure 13:
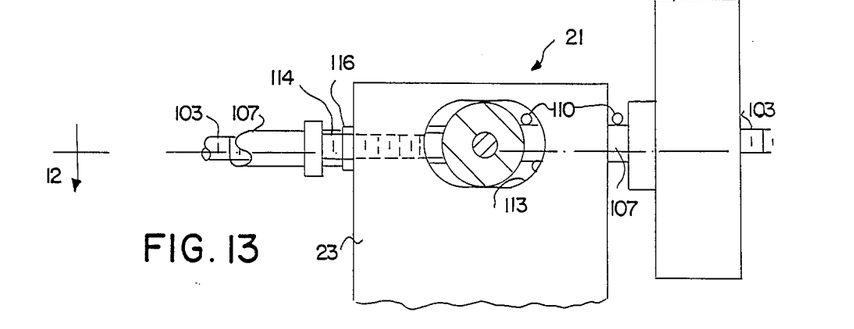
FIG. 13 is another front view of the band tension adjustment mechanism showing particularly the tilt or skew setting parts at the front plate of the tension lever.

Band Tension Adjustment Mechanism 25 is shown enlarged in FIGS. 11, 12 and 13. FIG. 11 is a front cross section view of the mechanism, the cross section taken through the transverse plane defined by the wheels 2 and 3 of the bandsaw and FIG. 12 is a top cross section view taken as shown in FIG. 11. As mentioned above, lever arm 21 that carries idler wheel 3 is formed of front and back arm plates 23 and 24 that pivot on axle 22 carried by transverse support member 11. Those arm plates 23 and 24 are shown in FIGS. 11 and 12. Also, rigid side plates 14 and 15 and the top transverse member 16 of the frame are all shown in FIGS. 11 and 12. The tension adjustment mechanism acts between arm 21 and plates 14 and 15. The mechanism is anchored pivotally to the frame at frame cross rod 101 connected between frame plates 14 and 15 and connects to lever arm 21 at the arm cross rod 102 attached to the arm plates 23 and 24 at the top ends thereof. Cross rod 102 delivers a spring force to the upper ends of lever arms exerting tension on the band and, depending on the arm skew setting against rod 102, skews the the front plate 23 of the lever arm with respect to the rear arm 24.

The band tension adjustment part of mechanism 25 includes a threaded rod 103 that extends at one end through a clearance hole 104 transverse through frame cross rod 101 and is secured thereto by nut 105 on the rod. Threaded on the other end of rod 103 is a manually turned knob 106 for manually adjusting the mechanism. Between knob 106 and cross rod 101 on the rod is a sleeve 107 that limits the closest position of the knob to frame cross rod 101. Sleeve 107 slideably fits through a transverse hole in 108 in the arm skew cross rod 102 that is fixed to the rear plate 24 of arm 21 and adjustably attached to the front plate 23 of the arm. A coil spring 110 is provided around sleeve 107 acting between knob 106 and cross rod 102.

In operation a force is exerted on a lever 21 by spring 110 depending upon the position of adjusting knob 106 along rod 103. That spring force applied to arm 21, via cross rod 102, tends to pivot the arm about its pivot axis 22 to increase tension of the saw band. That tension can be decreased by decreasing the spring force by turning knob 106 to increase the distance between the knob and frame cross rod 101 and so decrease the spring force.

The arm skew cross rod 102 is secured to rear plate 24 by rotatable fit in hole 111 in that plate and is held there by cap screw 112. The other end (front end) of cross rod 102 is secured to front plate 23 at oblong hole 113 thereof that allows substantial movement of that end in directions parallel to rod 103, referred to herein as the skew directions. The skew direction setting of the front end of skew rod 102 in oblong hole 113 is set by skew set screw 114 that screws into a tapped hole 115 in plate 23 and bears against that end of skew rod 102. A lock nut 116 on the screw fixes the position of skew set screw 114. By this structure, the skew position of front plate of arm 21 with respect to the back plate is adjusted and any such skew causes a corresponding skew at the other end of the arm where the idler wheel is mounted and tilts the plane of the idler wheel to effect the compensation desired.

Other Configurations

Figure 14:
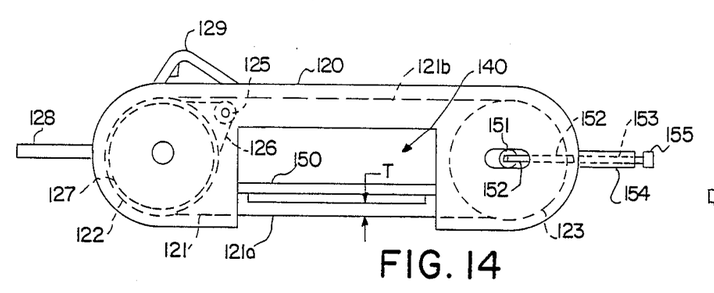
FIGS. 14, 15, and 16 are front, side, and top views of another embodiment of hand operated portable band saw according to the present invention including a cover that encloses the band saw wheels and defines a space between the wheels in which the slide or roller plate is adjusted to adjust the thickness of board that is cut from the log.
Figure 15:
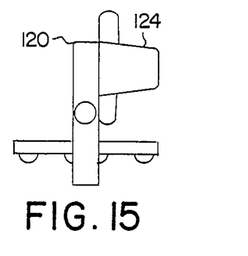
Figure 16:
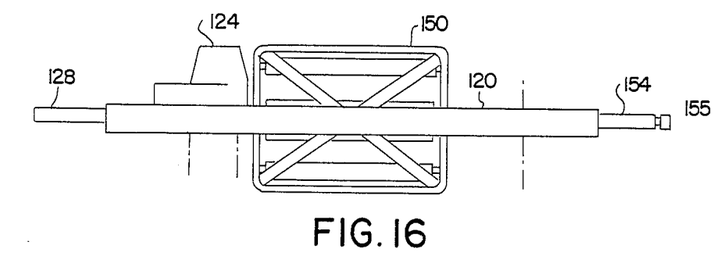

Another embodiment of the present invention of a portable band saw is illustrated in FIGS. 14, 15, and 16 which show front, side, and side views of the embodiment. Here, the frame is provided by a housing that completely encloses both the drive and the idler wheels of the band saw and encloses the return portion of the band and defines a space above the cutting portion the band in which is located the adjustable slide for riding on a flat top surface of the log to be cut.

In particular, the housing denoted generally 120 completely encloses the drive wheel 122, the idler wheel 123, and the return section 121b of the band and defines the space 140 in which the adjustable platform 150 is located. Drive motor 124 is attached to the outside of the housing and is shown attached here to the back of the housing directly driving a small drive wheel 125 within the housing connects by pulley 126 to a companion wheel 127 to the band drive wheel 122. A handle 128 is provided on the drive side of the housing and another handle 129 on that same side is provided with a switch for turning the drive motor on and off.

At the opposite side of the housing an extended axle 151 is provided for idle wheel 123 and a yoke 152 attached to that axle extends radially therefrom spanning wheel 123 and connects to an adjusting rod 153 contained within extending handle 154. At the end of handle 154 is an adjusting knob 155 that may be spring loaded against handle 154 and readily engage rod 153 to vary a spring force against axle 151 and so vary tension in the band 121. Thus, handle 154 carries the tension adjusting mechanism and also provides a handle on that side of the band saw. In operation, this embodiment is used to cut beams or planks from a log in any of the ways already described with reference to the embodiments shown in FIGS. 1 through 5 and platform 150 is adjusted to vary dimension T just as platform 30 is adjusted in FIGS. 1 through 5.

Figure 17:
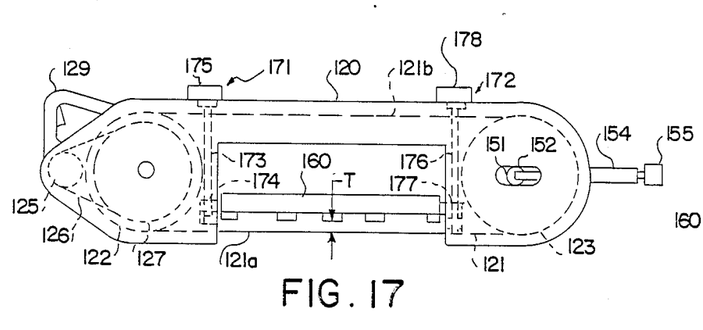
FIGS. 17, 18, and 19 are front, side, and top views of another embodiment similar to the embodiment in FIGS. 13, 14, and 15 and in which the motor drive shaft is positioned in line with the wheel axis and the slide has runners instead of rollers.
Figure 18:
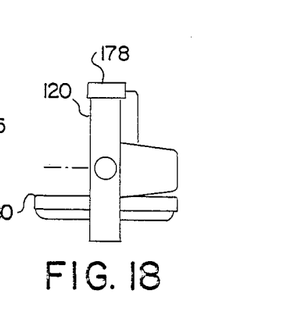
Figure 19:
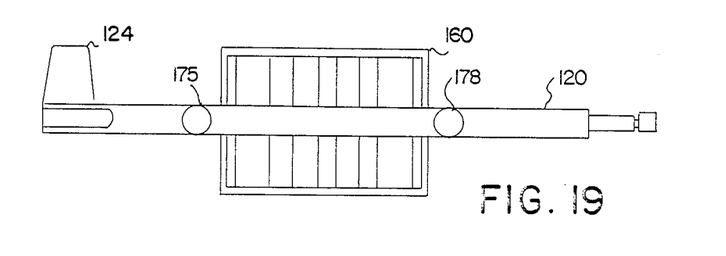

A third embodiment is illustrated in FIGS. 17, 18, and 19 which are front, side, and top views of that embodiment. Here, the drive is in line with the wheel axles and so the handle for the motor that carries the switch is at the end of the housing. Separate adjustment 171 and 172 are provided for adjusting the position of each side of platform 160 and includes a rod 173 extending from follower 174 on the platform and manipulated by an adjusting knob 175 on top of the housing. Similarly the other side of platform 160 is adjusted by rod 176 to follower 177 turned by adjusting knob 178 on the top of the housing on that side of the platform. Clearly, adjusting knobs 175 and 178 may be independently adjusted to move the platform and so vary the dimension T and they may be adjusted so that the platform is not parallel to the cutting portion 121a of the band. In that case, the piece cut from the beam would be wedge shaped in cross section. This latitude of adjustment of the platform is available in all embodiments of the present invention.

Conclusions

A portable band saw for cutting boards of variable thickness from a log has a frame that carries the band saw wheels and a space between the cutting length of the band and the frame that is large enough for the board that is cut from the log to fit through and a slide or rollers for riding on the log when the band saw is cutting a board from the log is carried by the frame in the space between the cutting length of the band and the frame so that the band saw rides along the log from end to end of the log while cutting a board from the log of thickness determined by the space between the cutting length of the band and the bottom of the slide. Additional equipment provides an even surface above a rough (raw) log on which the band saw rides to make the first cut on a rough log anchor plates are attached to each end of the log that carry supports for a smooth rigid beam suspended between the supports on which the band saw slide rides to cut a straight flat surface longitudinally along the log.

In a preferred embodiment, band guide rollers are provided where the band enters each wheel that keep the band centered on the wheel rim. This includes a roller that inhibits the band from sliding off the rim in the direction of the cutting edge (teeth) without damaging the teeth. A preferred embodiment also includes a band tension adjusting mechanism that can be adjusted also to tilt the idler wheel with respect the driven wheel to compensate for certain imperfections and problems described herein.

The inventions described herein with reference to the illustrated embodiments may be subject to modifications by those skilled in the art without departing from the spirit and scope of the inventions set forth in the appended claims.

What is claimed is:

1. Portable band saw apparatus for cutting a board from a log comprising,
    (a) a band saw having two upstanding wheels spaced on parallel axes and a continuous cutting band looped around each of said wheels providing the band cutting length from the bottom of one wheel to the bottom of the other wheel and the band return length from the top of one wheel to the top of the other wheel, (b) a frame having first and second members that carry said wheels and a top transverse member that connects said first and second members, (c) the return length of said band being below said frame transverse member, (d) the space between said cutting length, said return length and said frame first and second members being large enough for the piece cut from said log to fit through and (e) means carried by said frame in said space for riding on said log, including:

(f) a track on said frame first and second members extending downward from said return length of said band to just above said cutting length of said band and, (g) a platform for riding on said log, moveably attached to said track so that said platform can be positioned on said track at any of a plurality of positions from an upper position on said track, just below said return length of said band, to a lower position, just above said cutting length of said band, (h) whereby said apparatus rides on said log the length thereof and cuts said piece therefrom and the thickness of said piece is determined by the position of said platform on said track.

2. Apparatus as in claim 1 wherein, (a) said platform for riding on said log includes rollers.

3. Apparatus as in claim 1 wherein, (a) said platform for riding on said log extends along said log essentially parallel thereto.

4. Apparatus as in claim 2 wherein, (a) said platform for riding on said log includes a part that extends along said log and (b) one or more of said rollers are located along said extending part.

5. Apparatus as in claim 3 wherein, (a) said platform for riding on said log defines a riding plane, (b) said wheels and said band define a band saw plane, (c) said riding plane and said band saw plane are perpendicular to each other (d) said riding plane is between said cutting length of said band and said frame and (e) said cutting length of said band is parallel to said riding plane.

6. Portable band saw apparatus for sawing a log lengthwise comprising, (a) an upstanding frame spanning the width of said log and having a left upstanding side on one side of said log, a right upstanding side on the other side of said log and a horizontal top connecting said left and right sides, (b) a band saw having two wheels on spaced parallel axis and a continuous cutting band looped around each of said wheels, (c) one of said wheels being carried on said left side and the other being on said right side, (d) said wheels and said continuous cutting band defining a common upstanding plane transverse to the length of said log, (e) the cutting length of said band being at the bottom of said upstanding plane and the return length of said band being at the top of said upstanding plane and defining a space therebetween (f) said frame horizontal top member being above said band return length and (g) means carried between said left and right upstanding sides above said band cutting length and below said band return length for riding on said log, including:

(h) a track on said frame left and right sides extending downward from said return length of said band to just above said cutting length of said band and, (i) a platform for riding on said log, moveably attached to said track so that said platform can be positioned on said track at any of a plurality of positions from an upper position on said track, just below said return length of said band, to a lower position, just above said cutting length of said band, (j) whereby said apparatus platform can be positioned up and down in said space without limitation by said frame and said apparatus rides on said log the length thereof and cuts a piece lengthwise therefrom.

7. Apparatus as in claim 6 wherein, (a) said platform for riding on said log includes rollers.

8. Apparatus as in claim 6 wherein, (a) said platform for riding on said log extends along said log essentially parallel thereto.

9. Apparatus as in claim 7 wherein, (a) said platform for riding on said log includes a part that extends along said log and (b) one or more of said rollers are located along said extending part.

10. Apparatus as in claim 9 wherein, (a) said platform for riding on said log defines a riding plane, (b) said wheels and said band define a band saw plane, (c) said riding plane and said band saw plane are perpendicular to each other and (d) said cutting length of said band is parallel to said riding plane.

11. Apparatus as in claim 10 wherein, (a) said riding plane is between said cutting length and said return length of said band and below said frame.

12. On a band saw having two wheels, a driven wheel and an idler wheel spaced on parallel axes and a continuous cutting band looped around each of said wheels, the band having a front cutting edge with cutting teeth and a back edge without cutting teeth, means for inhibiting the band from sliding axially off at least one of said wheels comprising in combination, (a) front edge and back edge guide rollers on perpendicular axes, (b) said front edge guide roller axis being perpendicular to said band, (c) said rear edge guide roller axis being parallel to said band, (d) the rim of said front edge guide roller being positioned to intercept said band at said front cutting edge thereof when said band slides axially, (e) said front edge guide roller rim including an outer layer of material that is substantially softer than the material at said front cutting edge of said band, (c) whereby said band front cutting edge upon impacting said layer of material is inhibited from sliding off said wheel without substantial damage to said band front cutting edge.

13. A band saw as in claim 12 wherein,
(a) said front edge guide roller outer periphery is covered with said layer of material.

14. A band saw as in claim 13 wherein,
(A) said front edge guide roller has an inner core of material of the same order of hardness as said material at said edge of said band,
(b) whereby said inner core prevents said band from sliding off said wheel.

15. On a band saw having a frame, a driven wheel and an idler wheel space on parallel axes and a continuous cutting band looped around each of said wheels so that the band cutting length extends from the bottom of one wheel to the bottom of the other wheel and the band return length extends from the top of one wheel to the top of the other wheel, adjustable means for placing tension on said band comprising in combination,
(a) said frame having a first rigid member that carries said driven wheel, an assembly of other members that carries said idler wheel and a top transverse member that connects rigidly to said first member and said other members,
(b) said assembly of other members including a second rigid member rigidly attached to said transverse member and a lever member pivotally attached to said transverse member,
(c) the space between said cutting length, said return length and said frame first rigid member and said frame second rigid members being large enough for the piece cut from said log to fit through,
(d) means carried by said frame in said space for riding on said log,
(e) a track on said frame first and second rigid members extending downward from said return length of said band to just above said cutting length of said band and,
(f) said means riding on said log is moveable attached to said rack and can be positioned on said track to increase or decrease the thickness of said board cut from said log,
(g) said idler wheel is carried at one end of said lever member at one end thereof,
(h) a pivot axle for said lever member mounted to said frame,
(i) means attached between the other end of said lever member and said frame for exerting a resilient force on said lever member with respect to said frame and
(j) means are provided attached to said lever member for tilting the axis of said idler wheel with respect to said drive wheel axis,
(k) whereby said resilient force operating on said lever is applied to said wheel to impose resilient tension on said band and said means for tilting the axis of said idler wheel is effective to maintain said band centered on both of said wheels.

16. A band saw as in claim 15 wherein,
(a) said means includes a coil spring acting in compression the force of said compression acting between said lever member and said frame.

17. A band saw as in claim 16 wherein,
(a) said means for exerting a resilient force includes a rod with a manually operated control moveable mounted thereon,
(b) said coil spring bears against said lever member and said control and
(c) said rod connects to said frame.

18. A band saw as in claim 15 wherein,
(a) said means attached to said lever member for tilting the axis of said idler wheel with respect to said drive wheel axis includes means for twisting said lever member about an axis coextensive therewith.

* * * * *